(12) United States Patent
Tanaami et al.

(10) Patent No.: US 12,460,914 B2
(45) Date of Patent: Nov. 4, 2025

(54) MEASUREMENT SYSTEM AND CHECKING METHOD

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 3 days.

(21) Appl. No.: 18/336,468

(22) Filed: Jun. 16, 2023

(65) Prior Publication Data

US 2024/0019238 A1 Jan. 18, 2024

(30) Foreign Application Priority Data

Jul. 13, 2022 (JP) .................................. 2022-112695
Jul. 13, 2022 (JP) .................................. 2022-112696

(51) Int. Cl.
*G01B 5/28* (2006.01)
*B25J 19/02* (2006.01)
*G01B 5/00* (2006.01)

(52) U.S. Cl.
CPC .............. *G01B 5/285* (2013.01); *B25J 19/02* (2013.01); *G01B 5/0004* (2013.01)

(58) Field of Classification Search
None
See application file for complete search history.

(56) References Cited

U.S. PATENT DOCUMENTS

| 4,766,389 A * | 8/1988 | Rhoades ................ B25J 19/02 |
| | | 361/283.4 |
| 11,365,959 B2 * | 6/2022 | Tamura ................ B25J 13/088 |
| 11,660,747 B2 * | 5/2023 | Oaki ..................... B25J 9/1676 |
| | | 700/255 |
| 2022/0097544 A1 * | 3/2022 | Tanaami ................ B60L 53/16 |
| 2022/0118584 A1 * | 4/2022 | Tanaami ................ B24B 7/10 |
| 2022/0134557 A1 * | 5/2022 | Tanaami ................ B25J 9/163 |
| | | 700/250 |
| 2023/0031860 A1 * | 2/2023 | Tanaami ................ G01L 1/2293 |
| 2023/0055372 A1 * | 2/2023 | Tanaami ................ B25J 9/1633 |
| 2023/0266182 A1 * | 8/2023 | Tanaami ................ G01L 1/24 |
| | | 73/862.626 |
| 2023/0266184 A1 * | 8/2023 | Tanaami ................ G01L 1/24 |
| | | 73/862.624 |

(Continued)

FOREIGN PATENT DOCUMENTS

JP 2021-092531 A 6/2021

*Primary Examiner* — Jethro M. Pence
(74) *Attorney, Agent, or Firm* — Harness, Dickey & Pierce, P.L.C.

(57) ABSTRACT

In a measurement system, a processor sets, on the basis of three-dimensional data, a movement route to be taken by a hand part to cause a contact to follow the surface of an object to be measured in such a manner that a reaction force detected by a force sensor becomes a predetermined value. The processor causes the contact to follow the surface of the object to be measured while adjusting the reaction force to become a predetermined value, and acquires a path taken by the hand part having moved. The processor acquires the roughness of the surface of the object to be measured from the contact during a period in which the contact is caused to follow the surface. The processor measures the dimension of the object to be measured on the basis of the path and at least one of the movement route and the three-dimensional data.

6 Claims, 6 Drawing Sheets

(56) References Cited

U.S. PATENT DOCUMENTS

| | | | | |
|---|---|---|---|---|
| 2023/0266188 A1* | 8/2023 | Tanaami | ................... | G01L 1/24 |
| | | | | 73/865.8 |
| 2023/0278195 A1* | 9/2023 | Tanaami | ................ | B25J 9/1687 |
| 2023/0314246 A1* | 10/2023 | Tanaami | ................... | G01L 1/24 |
| | | | | 73/800 |
| 2023/0347530 A1* | 11/2023 | Tanaami | .................. | B25J 15/10 |
| 2023/0381953 A1* | 11/2023 | Tanaami | .................. | B25J 5/005 |
| 2024/0157574 A1* | 5/2024 | Tanaami | .................. | B25J 19/02 |
| 2024/0208075 A1* | 6/2024 | Tanaami | ................ | B25J 13/082 |

\* cited by examiner

MEASUREMENT SYSTEM AND CHECKING METHOD

This Nonprovisional application claims priority under 35 U.S.C. § 119 on Patent Application No. 2022-112695 filed in Japan on Jul. 13, 2022 and Patent Application No. 2022-112696 filed in Japan on Jul. 13, 2022, the entire contents of which are hereby incorporated by reference.

TECHNICAL FIELD

The present disclosure relates to a measurement system and a checking method.

BACKGROUND ART

Patent Literature 1 discloses a measurement device that includes a probe for carrying out three-dimensional measurement of a workpiece and a robot arm having a surface roughness meter at a tip thereof.

Patent Literature 1 discloses a measurement device that includes a robot arm having a surface roughness meter at a tip thereof.

CITATION LIST

Patent Literature

[Patent Literature 1]
Japanese Patent Application Publication Tokukai No. 2021-092531

SUMMARY OF INVENTION

Technical Problem

However, in the measurement device disclosed in Patent Literature 1, in order to avoid a collision between a three-dimensional coordinate measurement machine and the robot arm that supports the surface roughness meter, one measurement machine is retracted while measurement is carried out by the other measurement machine. Therefore, it was not possible to simultaneously measure a three-dimensional shape and surface roughness.

However, in the method disclosed in Patent Literature 1, there is a possibility of damaging the surface of an object to be measured during surface roughness measurement.

An object of an aspect of the present disclosure is to realize a measurement system in which the dimension of an object to be measured and the surface roughness thereof are simultaneously measured with use of one and the same contact.

An object of another aspect of the present disclosure is to realize a measurement system capable of detecting the roughness of a surface of an object to be measured without damaging the surface of the object to be measured.

Solution to Problem

To solve the above problem, a measurement system in accordance with an aspect of the present disclosure includes a contact, a hand part, a robot arm, a force sensor, and a control device. The contact is configured to detect roughness of a surface of an object to be measured. To the hand part, the contact is attached. The robot arm supports the hand part so as to allow a position and posture of the hand part to be changed. The force sensor is configured to, when the contact is pressed against the surface of the object to be measured, detect a reaction force from the surface of the object to be measured to the contact. The control device includes a storage section and one or more processors. The storage section stores three-dimensional data on a three-dimensional shape of the object to be measured. The one or more processors carry out a route setting process, a first acquisition process, a second acquisition process, and a dimension measurement process. In the route setting process, a movement route to be taken by the hand part to cause the contact to follow the surface of the object to be measured is set. This setting is carried out on the basis of the three-dimensional data in such a manner that a reaction force detected by the force sensor becomes a predetermined value. In the first acquisition process, a path taken by the hand part which has actually moved is acquired. This acquisition is carried out by actually causing the contact to follow the surface of the object to be measured while adjusting the reaction force detected by the force sensor to become the predetermined value. In the second acquisition process, the roughness of the surface of the object to be measured is acquired from the contact. This acquisition is carried out during a period in which the contact is actually caused to follow the surface of the object to be measured in the first acquisition process. In the dimension measurement process, a dimension of the object to be measured is measured. This measurement is carried out on the basis of the path and at least one selected from the group consisting of the movement route and the three-dimensional data.

To solve the above problem, a measurement system in accordance with another aspect of the present disclosure includes a contact, a hand part, a robot arm, a force sensor, and a control device. The contact is configured to detect roughness of a surface of an object to be measured. To the hand part, the contact is attached. The robot arm supports the hand part so as to allow a position and posture of the hand part to be changed. The force sensor is configured to, when the contact is pressed against the surface of the object to be measured, detect a reaction force from the surface of the object to be measured to the contact. The control device includes one or more processors. The one or more processors carry out a measurement process and a determination process. In the measurement process, the roughness of the surface of the object to be measured is acquired from the contact. This acquisition is carried out by causing the contact to follow the surface of the object to be measured while adjusting the posture and position of the hand part so that the reaction force detected by the force sensor becomes a predetermined value. In the determination process, whether the roughness of the surface of the object to be measured that has been acquired in the measurement process is within a predetermined range is determined.

A control device in accordance with each aspect of the present disclosure can be realized by a computer. In this case, the scope of the present disclosure also encompasses (i) a control device program for causing the computer to realize the control device by causing the computer to operate as sections (software elements) of the control device and (ii) a computer-readable storage medium recording the control device program.

Advantageous Effects of Invention

An aspect of the present disclosure makes it possible to simultaneously measure the dimension of an object to be measured and the surface roughness thereof with use of one and the same contact.

Another aspect of the present disclosure makes it possible to detect the roughness of the surface of an object to be measured without damaging the surface of the object to be measured.

DESCRIPTION OF EMBODIMENTS

Overview of First Embodiment of the Present Disclosure

First, an overview of a first embodiment of the present disclosure will be described.

(Item 1) A measurement system including: a contact configured to detect roughness of a surface of an object to be measured; a hand part to which the contact is attached; a robot arm supporting the hand part so as to allow a position and posture of the hand part to be changed; a force sensor configured to, when the contact is pressed against the surface of the object to be measured, detect a reaction force from the surface of the object to be measured to the contact; and a control device including a storage section storing three-dimensional data on a three-dimensional shape of the object to be measured and one or more processors, the one or more processors carrying out: a route setting process of, on a basis of the three-dimensional data, setting a movement route to be taken by the hand part to cause the contact to follow the surface of the object to be measured in such a manner that the reaction force detected by the force sensor becomes a predetermined value; a first acquisition process of actually causing the contact to follow the surface of the object to be measured while adjusting the reaction force detected by the force sensor to become the predetermined value, and acquiring a path taken by the hand part which has actually moved; a second acquisition process of acquiring the roughness of the surface of the object to be measured from the contact during a period in which the contact is actually caused to follow the surface of the object to be measured in the first acquisition process; and a dimension measurement process of measuring a dimension of the object to be measured on a basis of the path and at least one selected from the group consisting of the movement route and the three-dimensional data.

According to the above-described configuration, it is possible to simultaneously measure the dimension of the object to be measured and the surface roughness thereof with use of one and the same contact. Therefore, it is possible to improve work efficiency of checking the three-dimensional shape and the surface roughness.

(Item 2) The measurement system according to item 1, wherein the force sensor is capable of detecting the reaction force for each component in three directions orthogonal to each other, and in the first acquisition process, while causing the contact to follow the surface of the object to be measured, the one or more processors: adjust the posture of the hand part so that a normal direction of the surface of the object to be measured becomes parallel to one direction among the three directions; adjust the position of the hand part so that a component of the reaction force in the one direction becomes the predetermined value; and acquire the path taken by the hand part which has actually moved.

According to the above-described configuration, the force sensor is capable of detecting reaction forces in three directions that are orthogonal to each other. Therefore, it is possible to properly measure the three-dimensional shape and the surface roughness even though the surface of the object to be measured is curved.

(Item 3) The measurement system according to item 1 or 2, wherein the contact includes: a detection section configured to detect the roughness of the surface of the object to be measured; and a housing section configured to, while the contact is not pressed against the surface of the object to be measured, cause at least part of the detection section to protrude outside the housing section and, while the contact is pressed against the surface of the object to be measured, cause the detection section to be held in the housing section, and when the contact is pressed against the surface of the object to be measured, the force sensor detects the reaction force from the surface of the object to be measured to the housing section.

According to the above-described configuration, the detection section is configured to be held in the housing section while the contact is pressed against the surface of the object to be measured. Therefore, it is possible to prevent damage to the detection section due to an excessive reaction force.

(Item 4) The measurement system according to any one of items 1 to 3, wherein, in the dimension measurement process, the dimension of the object to be measured is measured on the basis of an amount of deviation between the movement route and the path and the three-dimensional data.

According to the above-described configuration, it is possible to measure the dimension of the object to be measured without calibrating, for example, the distance from the hand part to a tip part of the contact in attaching the contact to the hand part.

(Item 5) The measurement system according to any one of items 1 to 4, wherein the three-dimensional data further includes information on the roughness of the surface of the object to be measured, and the one or more processors further carry out: a first checking process of checking whether a difference between the roughness of the surface of the object to be measured that has been acquired in the second acquisition process during the acquisition of the path in the first acquisition process and the roughness of the surface of the object to be measured based on the three-dimensional data is within a predetermined range; and a second checking process of checking whether a difference between the dimension of the object to be measured that has been subjected to the measurement in the dimension measurement process and a dimension based on the three-dimensional data is within a predetermined range.

According to the above-described configuration, it is possible to simultaneously check the dimension of the object to be measured and the surface roughness thereof. Therefore, it is possible to efficiently check the object to be measured.

(Item 6) The measurement system according to any one of items 1 to 5, wherein the object to be measured is a target material used in a thin film manufacturing process or a plastic molded product.

Conventionally, a finish inspection of a plastic molded product has often been carried out visually by an inspector, and scratches on the surface of the plastic molded product have sometimes been overlooked. In addition, the plastic molded product is often produced by injection molding and has a large dimensional error. The use of the above-described measurement system is efficient because the above-described measurement system enables the surface roughness of a plastic molded product and the dimension thereof to be simultaneously measured.

Further, conventionally, the surface roughness of the target material has been measured by a level difference meter which can measure a small area at a time. Therefore, it has been difficult to measure the surface roughness of the entire target material. By using the measurement system 1, it is possible to carry out measurement over a larger area than the area over which the level difference meter carries out the measurement, and it is further possible to simultaneously measure the thickness dimension of the target material.

(Item 7) A checking method for checking roughness of a surface of an object to be measured and a dimension of the object to be measured with use of the measurement system according to any one of items 1 to 6.

According to the above-described configuration, it is possible to simultaneously measure the dimension of the object to be measured and the surface roughness thereof.

(Item 8) A program for operating a control device provided in the measurement system according to any one of items 1 to 6, the program causing the one or more processors to carry out the above-described processes.

According to the above-described configuration, by causing the one or more processors to carry out each process of the measurement system, it is possible to simultaneously measure the dimension of the object to be measured and the surface roughness thereof.

Example of First Embodiment of the Present Disclosure

Figure 1:
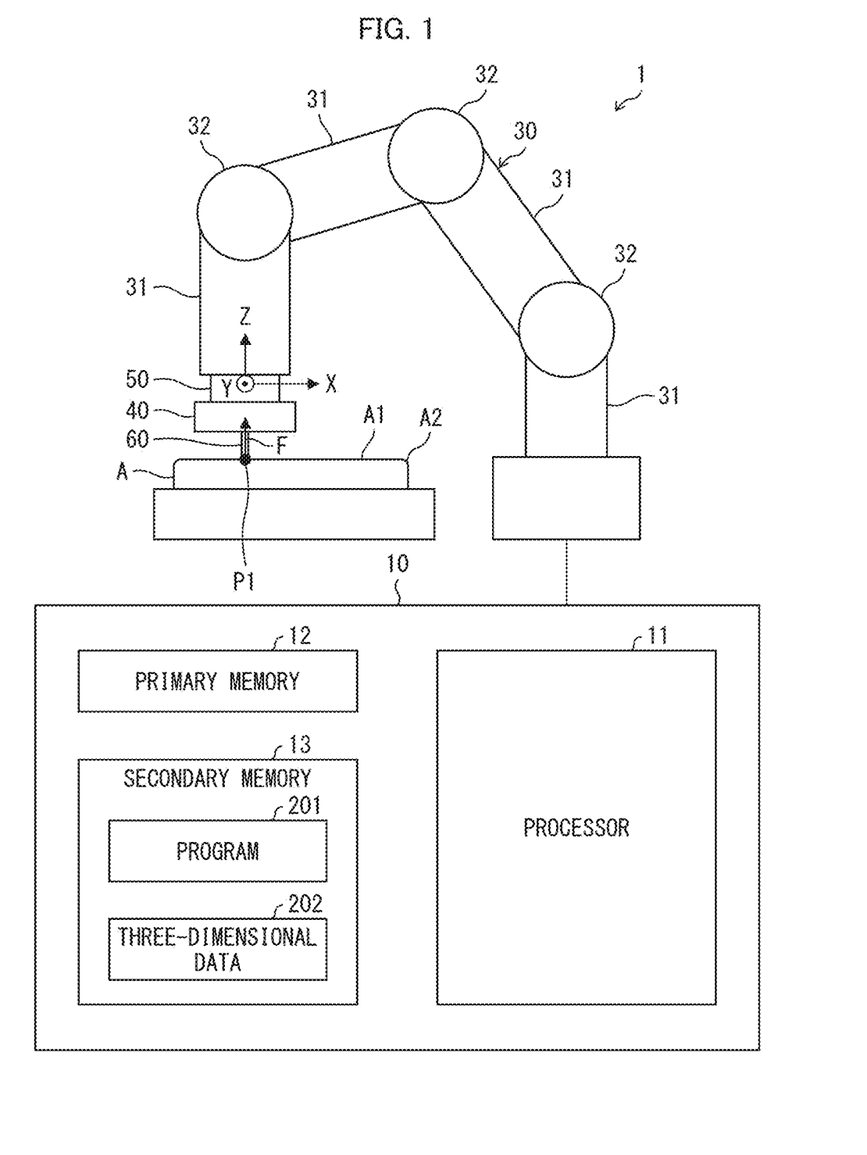
FIG. 1 is a view illustrating an example of a configuration of a measurement system in accordance with an embodiment of the present disclosure.

The following will describe a first embodiment of the present disclosure in detail.
(Configuration of Measurement System 1)
FIG. 1 is a view illustrating an example of a configuration of a measurement system 1 in accordance with a first embodiment of the present disclosure. The measurement system 1 includes a control device 10, a robot arm 30, a hand part 40, a force sensor 50, and a contact 60.

The control device 10 has a processor 11, a primary memory 12, and a secondary memory 13. The processor 11 is constituted by, for example, a central processing unit (CPU). The processor 11 may be constituted by a graphic processing unit (GPU), a digital signal processor (DSP), a micro processing unit (MPU), a floating point number processing unit (FPU), a physics processing unit (PPU), a microcontroller, or a combination thereof.

The primary memory 12 is constituted by, for example, a semiconductor random access memory (RAM). The secondary memory 13 is an example of a storage section in which a program 201 and three-dimensional data 202 are stored. The secondary memory 13 is constituted by, for example, a flash memory, a hard disk drive (HDD), a solid state drive (SSD), an optical disk drive (ODD), or a combination thereof. The three-dimensional data 202 stores the dimension of the three-dimensional shape of the object A to be measured and the surface roughness thereof.

The processor 11 loads, on the primary memory 12, the program 201 stored in the secondary memory 13. Then, the processor 11 controls each section of the measurement system 1 in accordance with an instruction which is included in the program 201 loaded on the primary memory 12.

Note that, although the present embodiment employs a configuration in which a single processor (processor 11) is used to control each section of the measurement system 1, the present disclosure is not limited to this configuration. That is, a configuration in which each section of the measurement system 1 is controlled with use of a plurality of processors may be employed. In this case, a plurality of processors which work together to control each section of the measurement system 1 may be provided in a single computer and configured to be communicable with each other. Alternatively, the plurality of processors may be provided in a respective plurality of computers and configured to be communicable with each other over a network. For example, the following configuration can be employed: a processor contained in a computer constituting a cloud server and a processor contained in a computer owned by a user of the cloud server work together to execute the program 201.

The robot arm 30 is an articulated arm including a plurality of arms 31. In the robot arm 30, four arms 31 are connected by three joints 32. However, the number of arms 31 included in the robot arm 30 is not limited to four. The number of joints 32 connecting the arms 31 is not limited to only three.

The hand part 40 is attached to the robot arm 30 via the force sensor 50. A contact 60 is attached to the hand part 40. The robot arm 30 has six degrees of freedom and supports the hand part 40 so as to allow the position and posture of the hand part 40 to be changed.

The force sensor 50 detects the directions and magnitudes of forces and moments that exert on the force sensor 50. The force sensor 50 is a six-axis force sensor that detects respective magnitudes (FX, FY, FZ) of a force exerted in directions of three axes (X-axis, Y-axis, Z-axis) orthogonal to each other and respective magnitudes (MX, MY, MZ) of a moment about these axes. Hereinafter, FX, FY, FZ, MX, MY, and MZ will also be referred to as force components or simply as detected values. The force sensor 50 outputs, to the control device 10, signals on the detected values.

The contact 60 detects the roughness of a contact point P1 of a surface A1 while the contact 60 is pressed against the surface A1 of the object A to be measured. The contact 60 outputs, to the control device 10, a detection signal on the roughness of the contact point P1 of the surface A1. When the position and posture of the hand part 40 are changed by the robot arm 30, the position and posture of the contact 60 are changed together with the hand part 40. The measurement system 1 moves the contact 60 in such a manner that the contact 60 follows the surface A1 or the like of the object A to be measured, thereby enabling detection of the roughness of the surface A1 or the like of the object A to be measured. The object A to be measured is, for example, a target material used in a thin film manufacturing process by a vapor phase growth method such as sputtering, a plastic molded product manufactured by injection molding or the like, and the like.

Figure 2:
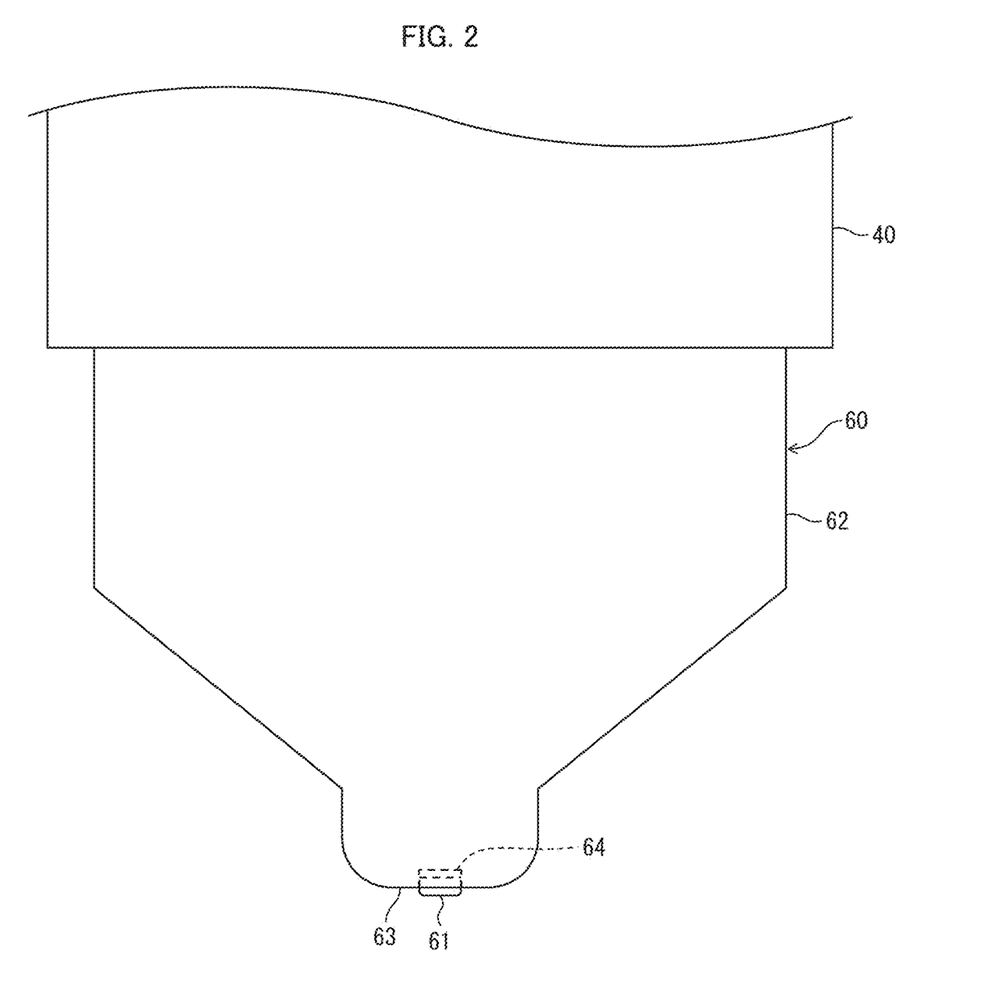
FIG. 2 is a view illustrating an example of a contact used in the measurement system.

FIG. 2 is an enlarged view of the contact 60 which is attached to the hand part 40. The contact 60 includes a detection section 61 and a housing section 62. A tip portion 63 of the housing section 62 has a holding part 64 that is capable of holding the detection section 61 therein. The detection section 61 is so biased that a portion of the detection section 61 protrudes from the holding part 64 to the outside of the tip portion 63.

Figure 3:
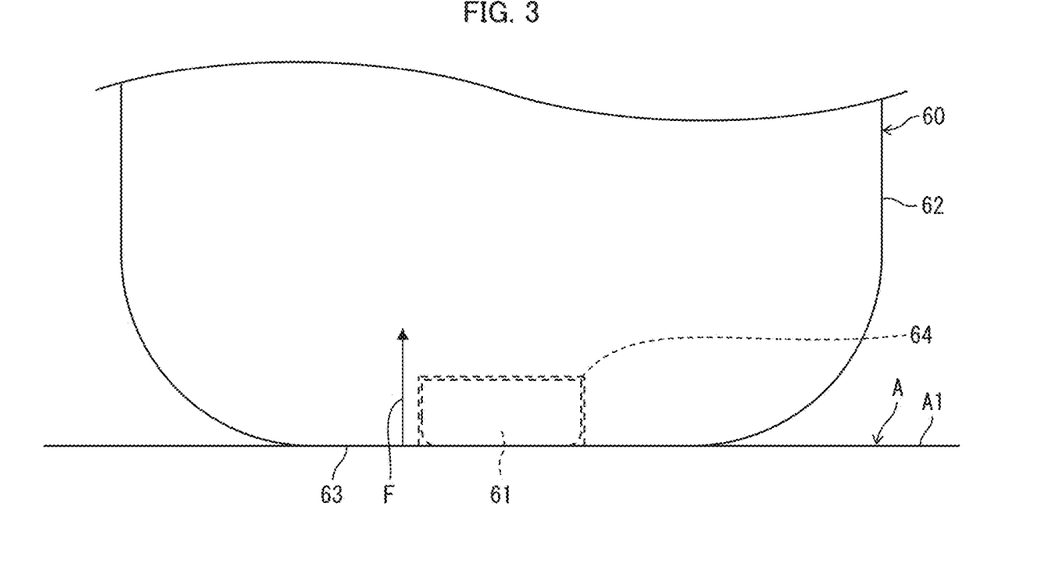
FIG. 3 is an enlarged view of a tip of the contact.

In a case where the contact 60 is pressed against the surface A1 of the object A to be measured as illustrated in FIG. 1, the detection section 61 of the contact 60 is held in the holding part 64 of the housing section 62 as illustrated in FIG. 3. FIG. 3 illustrates a state in which the detection section 61 of the contact 60 is held in the holding part 64 of the housing section 62. The detection section 61 is so biased as to protrude from the holding part 64. Therefore, even in a state of being held in the holding part 64, the detection section 61 contacts the surface A1 of the object A to be measured. The detection section 61 detects, in nanometers, the roughness of the surface A1 that is in contact with the detection section 61. In addition, the tip portion 63 of the housing section 62 is also in contact with the surface A1, and the force sensor 50 in FIG. 1 detects a reaction force F (FX, FY, FZ)=(0, 0, F0) applied to the housing section 62 that is in contact with the surface A1.

Figure 4:
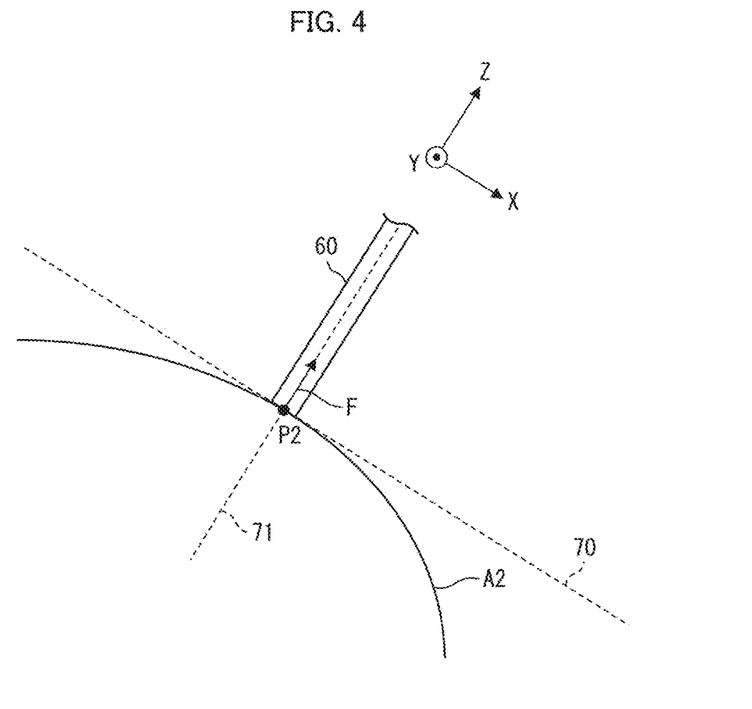
FIG. 4 is a view illustrating a situation in which the contact is pressed against the surface of an object to be measured.

FIG. 4 illustrates a state in which the contact 60 is in contact with a surface A2 of the object A to be measured at a contact point P2. The surface A2 is a curved surface. In FIG. 4, a tangential direction 70 of the surface A2 at the contact point P2 and a normal direction 71 of the surface A2 orthogonal to the tangential direction 70 are depicted. As illustrated in FIG. 4, the contact 60 contacts the surface A2 from the normal direction 71 of the surface A2.

Even when the contact 60 is pressed against the surface A2 as illustrated in FIG. 4, the detection section 61 of the contact 60 illustrated in FIG. 2 is held in the holding part 64 of the housing section 62 and detects the roughness of the surface A2. In addition, the force sensor 50 detects the reaction force F (FX, FY, FZ)=(0, 0, F0) applied to the housing section 62 that is in contact with the surface A2.

Figure 5:
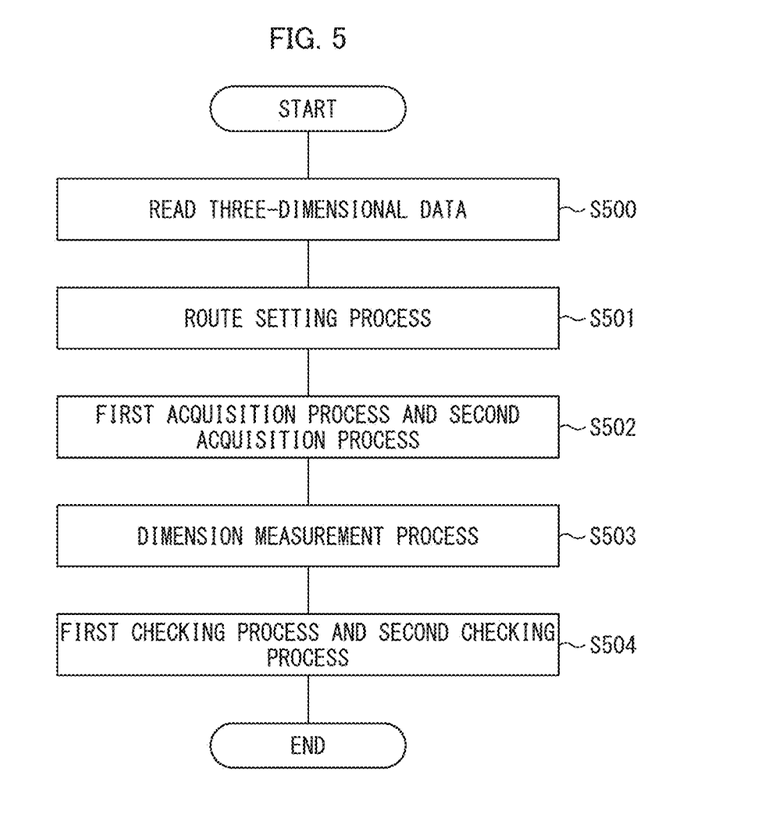
FIG. 5 is a flowchart illustrating a step of checking an object to be measured by the measurement system in accordance with an embodiment of the present disclosure.

FIG. 5 is a flowchart for a finish inspection of a plastic molded product by the measurement system 1. Conventionally, a finish inspection of a plastic molded product has often been carried out visually by an inspector, and scratches on the surface of the plastic molded product have sometimes been overlooked. In addition, the plastic molded product is often produced by injection molding and has a large dimensional error. The finish inspection of a plastic molded product with use of the measurement system 1 is efficient because such a finish inspection enables the surface roughness of the plastic molded product and the dimension thereof to be simultaneously checked in the production line thereof.
(Step S500)

In S500 of FIG. 5, the processor 11 reads, from the secondary memory 13, the three-dimensional data 202 of a plastic molded product, which is the object A to be measured, under instructions or the like from the inspector (S500).

(Step S501)

In step S501, the processor 11 carries out a route setting process. In the route setting process, the processor 11 sets a movement route of the hand part 40 on the basis of off-line teaching based on the three-dimensional data 202 read in S500. The movement route set in the route setting process is a movement route to be taken to cause the contact 60 to follow the surface A1, A2, or the like of the object A to be measured in such a manner that the reaction force F (FX, FY, FZ) detected by the force sensor 50 becomes a predetermined value (0, 0, F1). Here, F1 is a force that the detection section 61 of the contact 60 can withstand without damage or the like, and is, for example, 5 N.

More specifically, in the route setting process (S501), the processor 11 determines, on the basis of the three-dimensional data 202, the normal direction 71 as illustrated in FIG. 4 for each position on a surface, which is the surface A1, A2 or the like, of the object A to be measured against which the contact 60 is pressed. Then, the processor 11 sets the posture of the hand part 40 so that the contact 60 faces in the determined normal direction 71. The control device 10 sets the position of the hand part 40 on the basis of the set posture of the hand part 40 and the three-dimensional data 202. The position of the hand part 40 to be set is a position which is apart from the surface A2 or the like of the object A to be measured along the normal direction 71 and at which the reaction force F (FX, FY, FZ) detected by the force sensor is the predetermined value (0, 0, F1).

Figure 6:
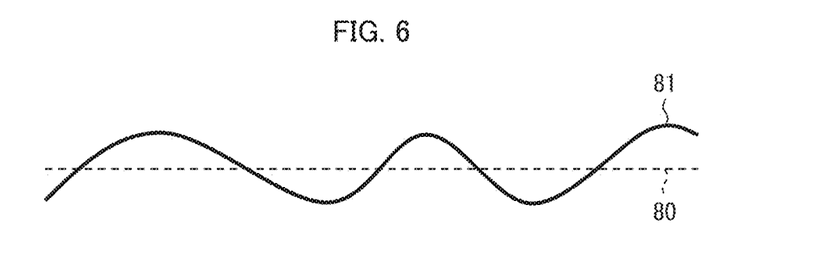
FIG. 6 is a view illustrating examples of a movement route set for a hand part which is used in the measurement system and of an actual path.

FIG. 6 illustrates an example of the movement route set in the route setting process. A movement route 80 illustrated in FIG. 6 is a movement route to be taken to cause the contact 60 to follow the surface A1 of the object A to be measured in such a manner that the reaction force F (FX, FY, FZ) detected by the force sensor 50 becomes the predetermined value (0, 0, F1).

(Step S502)

In S502, the processor 11 carries out a first acquisition process and a second acquisition process. In the first acquisition process, the processor 11 controls the robot arm 30 to actually cause the contact 60 to follow the surface A1, A2, or the like of the object A to be measured while adjusting the reaction force F (FX, FY, FZ) detected by the force sensor 50 to become a predetermined value (0, 0, F1), and acquires a path taken by the hand part 40 which has actually moved.

A path 81 illustrated in FIG. 6 is a path taken by the hand part 40 which has actually moved to cause the contact 60 to follow the surface A1 of the object A to be measured in such a manner that the reaction force F (FX, FY, FZ) detected by the force sensor 50 becomes the predetermined value (0, 0, F1). This path 81 coincides with a ridge line of undulations seen on the surface A1 of the object A to be measured. That is, the measurement system 1 makes it possible to measure undulations of the surface A1 of the object A to be measured with use of the force sensor 50.

More specifically, in the first acquisition process, on the basis of the movement route 80 in FIG. 6 that has been set in the route setting process (S501), the processor 11 controls the robot arm 30 to move the hand part 40 in such a manner that the contact 60 follows the surface A1 of the object A to be measured in FIG. 1. During movement of the hand part 40, the processor 11 acquires a measured value of the reaction force F (FX, FY, FZ) from the force sensor 50 and determines whether the measured value is the predetermined value (0, 0, F1). In a case where the processor 11 has determined that the measured value of the reaction force F (FX, FY, FZ) is not the predetermined value (0, 0, F1), the processor 11 adjusts the position and posture of the hand part 40 so that the measured value of the reaction force F (FX, FY, FZ) becomes the predetermined value (0, 0, F1). The processor 11, by adjusting the posture of the hand part 40 so that the X-axis direction component FX and the Y-axis direction component FY of the reaction force F become 0, adjusts the contact 60 to be pressed against the surface A1 from the normal direction (Z-axis direction). In the first acquisition process, the processor 11 adjusts the position of the hand part 40 so that the Z-axis direction component FZ of the reaction force F becomes the predetermined value F1.

In the second acquisition process, during a period in which the contact 60 is actually caused to follow the surface A1 or the like of the object A to be measured in the first acquisition process, the processor 11 acquires, from the detection section 61 of the contact 60, a measured value regarding the roughness of the surface A1 or the like of the object A to be measured. For example, in a case where the contact 60 is caused to follow the surface A1 of the object A to be measured, the processor 11 detects the roughness of the surface A1 from the detection section 61 of the contact 60.

(Step S503)

In S503 of FIG. 5, the processor 11 carries out a dimension measurement process. In the dimension measurement process, the processor 11 measures the dimension of the object A to be measured on the basis of the three-dimensional data 202 and the amount of deviation between the movement route 80 that has been set in the movement route process (S501) and the path 81 that has been acquired in the first acquisition process (S502). For example, in a case where the amount of deviation in the Z-axis direction between the movement route 80 and the path 81 is −0.3 mm, and the thickness dimension of the object A to be measured in the three-dimensional data 202 is 50 mm, the processor 11 measures the actual dimension of the thickness of the object A to be measured to be 49.7 mm.

(Step S504)

In S504, the processor 11 carries out a first checking process and a second checking process. In the first checking process, the processor 11 checks whether a difference between the roughness of the surface A1 or the like of the object A to be measured that has been acquired in the second acquisition process during the acquisition of the path 81 in the first acquisition process and the roughness of the surface A1 or the like of the object A to be measured based on the three-dimensional data 202 is within a predetermined range.

In the second checking process, the processor 11 checks whether a difference between the dimension of the object A to be measured that has been measured in the dimension measurement process (S503) and the dimension based on the three-dimensional data 202 is within a predetermined range. In other words, in the second checking process, the processor 11 checks whether the amount of deviation between the movement route 80 that has been set in the route setting process (S501) and the path 81 that has been acquired in the first acquisition process (S502) is within a predetermined range.

Variations

In the measurement system 1 in accordance with the above-described embodiment, the program 201 and the three-dimensional data 202 are assumed to be stored in the secondary memory 13 of the control device 10. However, the present disclosure is not limited to only this configuration. For example, the program 201 and the three-dimensional data 202 may be stored in a storage section outside the control device 10.

In the measurement system 1 in accordance with the above-described embodiment, in the dimension measurement process in S503, the processor 11 measures the dimension of the object A to be measured on the basis of the movement route 80 that has been set in the movement route process, the path 81 that has been acquired in the first acquisition process, and the three-dimensional data 202. However, in the dimension measurement process, it is only necessary that at least the amount of deviation between the movement route 80 and the path 81 is measured, and the measurement of the dimension of the object A to be measured does not have to be a measurement carried out on the basis of the amount of deviation and the three-dimensional data 202. In the dimension measurement process, in a case where the measurement of the dimension of the object A to be measured is not a measurement carried out on the basis of the amount of deviation and the three-dimensional data 202, the three-dimensional data 202 is not required in the dimension measurement process, and it is only necessary in the second checking process that a determination is made as to whether the amount of deviation between the movement route 80 and the path 81 is within a predetermined range.

Alternatively, in the dimension measurement process in S503, the measurement of the dimension of the object A to be measured may be a measurement carried out on the basis of the path 81 that has been acquired in the first acquisition process and the three-dimensional data 202. For example, in the dimension measurement process, the amount of deviation between the path 81 and the dimension of the three-dimensional shape included in the three-dimensional data 202 may be measured. In the second checking process, it is only necessary that, under the condition that the measurement system 1 is calibrated so that a distance from the hand part 40 to the tip portion 63 of the contact 60 becomes a predetermined value L, a determination is made as to whether the amount of deviation between the path 81 and the dimension of the three-dimensional shape included in the three-dimensional data 202 is within a predetermined range including the predetermined value L.

In the above-described embodiment, a finish inspection of a plastic molded product has been described as an example of a step of checking the object A to be measured by the measurement system 1. However, the object A to be measured to be checked by the measurement system 1 is not limited to only a plastic molded product. For example, the measurement system 1 can be used to simultaneously check the surface roughness of a target material used in the thin film manufacturing process by a vapor phase growth method such as sputtering and the thickness dimension thereof. In a case where the target material is checked by using the measurement system 1, it is assumed that the three-dimensional data 202 of the target material is read from the secondary memory 13 in S500. To form a film having uniform thickness by a vapor phase growth method, the surface roughness of the target material has been conventionally measured by a level difference meter which can measure a small area at a time. Therefore, it has been difficult to measure the surface roughness of the entire target material. Due to carrying out measurement with use of the hand part 40 to which the contact 60 is attached, the measurement system 1 makes it possible to carry out measurement over a larger area than the area over which the level difference meter carries out the measurement, and further makes it possible to measure the thickness dimension of the target material simultaneously with the surface roughness of the target material.

Overview of Second Embodiment of the Present Disclosure

First, an overview of a second embodiment of the present disclosure will be described.

(Item 1) A measurement system including: a contact configured to detect roughness of a surface of an object to be measured; a hand part to which the contact is attached; a robot arm supporting the hand part so as to allow a position and posture of the hand part to be changed; a force sensor configured to, when the contact is pressed against the surface of the object to be measured, detect a reaction force from the surface of the object to be measured to the contact; and a control device including one or more processors, the one or more processors carrying out: a measurement process of, by causing the contact to follow the surface of the object to be measured while adjusting the posture and position of the hand part so that the reaction force detected by the force sensor becomes the predetermined value, acquiring the roughness of the surface of the object to be measured from the contact; and a determination process of determining whether the roughness of the surface of the object to be measured that has been acquired in the measurement process is within a predetermined range.

According to the above-described configuration, the reaction force from the surface of the object to be measured to the contact is detected with use of the force sensor. Therefore, it is possible to detect the roughness of the surface of the object to be measured without damaging the surface of the object to be measured.

(Item 2) The measurement system according to item 1, wherein the contact includes: a detection section configured to detect the roughness of the surface of the object to be measured; and a housing section configured to, while the contact is not pressed against the surface of the object to be measured, cause at least part of the detection section to protrude outside the housing section and, while the contact is pressed against the surface of the object to be measured, cause the detection section to be held in the housing section, and when the contact is pressed against the surface of the object to be measured, the force sensor detects the reaction force from the surface of the object to be measured to the housing section.

According to the above-described configuration, the detection section is configured to be held in the housing section while the contact is pressed against the surface of the object to be measured. Therefore, it is possible to prevent damage to the detection section due to an excessive reaction force.

(Item 3) A program for operating a control device that is provided in the measurement system according to item 1 or 2, the program causing the one or more processors to carry out the foregoing processes.

According to the above-described configuration, the one or more processors are caused to carry out the processes of the measurement system. Therefore, it is possible to detect the roughness of the surface of the object to be measured without damaging the surface of the object to be measured.

(Item 4) A checking method using the measurement system according to item 1 or 2, including: a surface treatment step of subjecting the surface of the object to be measured to a surface treatment; a measurement step of acquiring the roughness of the surface of the object to be measured that has been subjected to the surface treatment in the surface treatment step by the one or more processors carrying out the measurement process; and a determination step of determining whether the roughness of the surface of the object to be measured that has been subjected to the measurement in the measurement step is within a predetermined range by the one or more processors carrying out the determination process.

According to the above-described configuration, the measurement process is carried out on the object to be measured after the surface treatment. Therefore, in detecting the roughness of the surface of the object to be measured, the posture and position of the hand part are adjusted so that the reaction force from the surface of the object to be measured to the contact becomes a predetermined value, so that the surface of the object to be measured after the surface treatment is not damaged.

(Item 5) The checking method according to item 4, including: a substrate treatment step, being the surface treatment step, of subjecting the surface of the object to be measured to a substrate treatment as the surface treatment which is carried out before a coating is applied to the surface of the object to be measured; a first measurement step of subjecting, to the measurement step, the object to be measured that has been subjected to the substrate treatment in the substrate treatment step, to acquire the roughness of the surface of the object to be measured; a first determination step of subjecting, to the determination step, the object to be measured that has been subjected to the measurement in the first measurement step, to determine whether the roughness of the surface of the object to be measured is within a first range; a coating step, being the surface treatment step, of subjecting, to the application of the coating as the surface treatment, the surface of the object to be measured that has been determined in the first determination step to have roughness within the first range; a second measurement step of subjecting, to the measurement step, the object to be measured that has been subjected to the application of the coating in the coating step, to acquire the roughness of the surface of the object to be measured; and a second determination step of subjecting, to the determination step, the object to be measured that has been subjected to the measurement in the second measurement step, to determine whether the roughness of the surface of the object to be measured is within a second range.

According to the above-described configuration, a finish after the substrate treatment step and the coating step is not visually checked by an inspector. This makes it easy to improve the working environment for the inspector and makes it possible to reduce the occurrence of, for example, overlooking of scratches. In addition, all the steps from the substrate treatment to the second determination step can be carried out in an in-line manner. Therefore, it is possible to improve the efficiency of the finish inspection.

(Item 6) The checking method according to item 5, wherein, in the second measurement step, a posture and position of the hand part are adjusted on a basis of a path taken by the hand part which has caused the contact to follow the surface of the object to be measured in the first measurement step.

According to the above-described configuration, the posture and position of the hand part in the second measurement step are adjusted on the basis of a path taken by the hand part which has caused the contact to follow the surface of the object to be measured in the first measurement step. Therefore, it is possible to prevent the occurrence of scratches on the surface of the object to be measured after the application of a coating.

(Item 7) The checking method according to item 4, wherein the object to be measured is a display, and the measurement step and the determination step are carried out on a production line on which the display has been subjected to the surface treatment in the surface treatment step.

According to the above-described configuration, the measurement step and the determination step can be carried out on the production line on which the display has been subjected to the surface treatment. Therefore, it is possible to efficiently advance the production and check of the display.

Example of Second Embodiment of the Present Disclosure

The following will describe a second embodiment of the present disclosure in detail. For convenience of description, members having functions identical to those described in the first embodiment are assigned identical referential numerals, and their descriptions are omitted here. However, in the present embodiment, the three-dimensional data 202 stored in the secondary memory 13 illustrated in FIG. 1 is not an essential component.

(Process of Controlling Each Section of Measurement System 1)

A process of the processor 11 of the control device 10 controlling each section of the measurement system 1 includes a measurement process and a determination process. The measurement process is a process of, by causing the contact 60 to follow the surface A1 or the like of the object A to be measured while adjusting the posture and position of the hand part 40 so that a reaction force F (FX, FY, FZ) detected by the force sensor 50 becomes a predetermined value (0, 0, F0), acquiring the roughness of the surface A1 or the like of the object A to be measured from the detection section 61 of the contact 60. The determination process is a process of determining whether the roughness of the surface A1 or the like of the object A to be measured that has been acquired in the measurement process is within a predetermined range.

The measurement process will be more specifically described by taking, as an example, a method for acquiring the roughness of the surface A1 of the object A to be measured illustrated in FIG. 1. The processor 11 controls the robot arm 30 to adjust the contact 60 to be pressed against the surface A1 of the object A to be measured from the normal direction (Z-axis direction). The processor 11 adjusts the posture of the hand part 40 so that the X-axis direction component FX of the reaction force F and the Y-axis direction component FY thereof become 0, and adjusts the position of the hand part 40 so that the Z-axis direction component FZ becomes the predetermined value F0. Here, F0 is a force within the bounds of the contact 60 not damaging the surface A1 of the object A to be measured.

The processor 11 controls the robot arm 30 to move the contact 60 in such a manner that the contact 60 follows the surface A1 of the object A to be measured while adjusting the posture and position of the hand part 40 so that the reaction force F (FX, FY, FZ) detected by the force sensor 50 becomes a predetermined value. The processor 11 acquires a measured value of the roughness of the surface A1 or the like from the contact 60 at a timing when the measured value of the reaction force F (FX, FY, FZ) detected by the force sensor 50 becomes a predetermined value.

Figure 7:
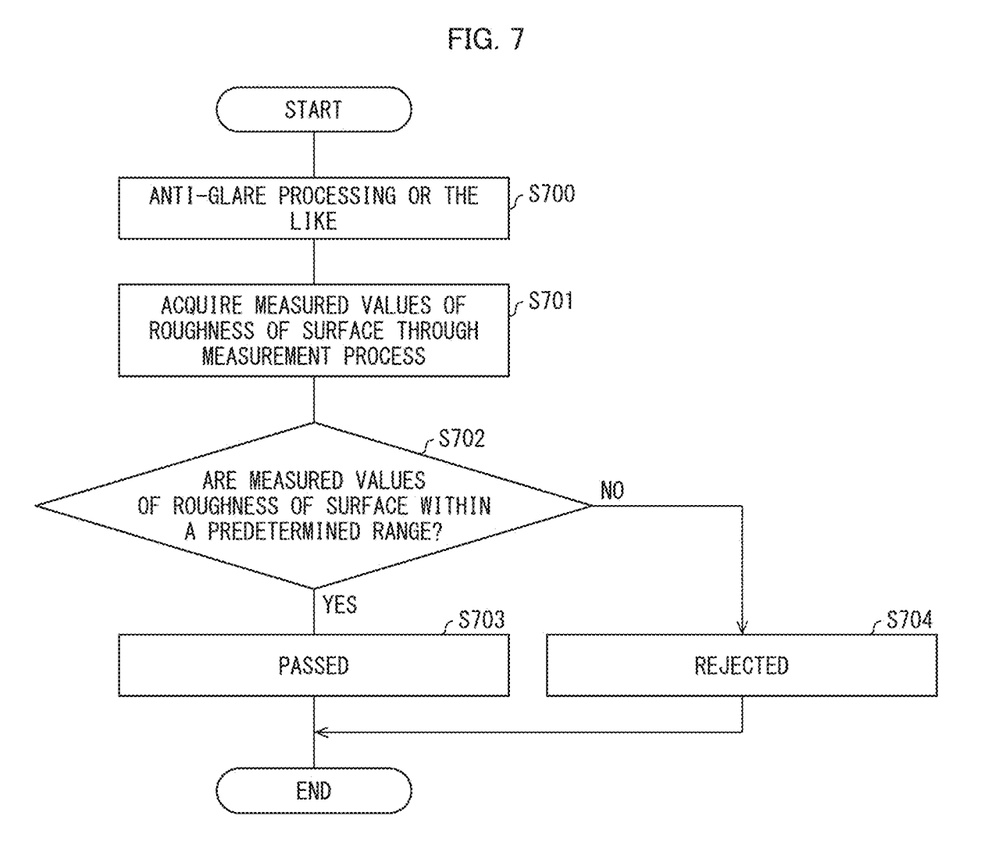
FIG. 7 is a flowchart illustrating an example of a step of checking an object to be measured by a measurement system in accordance with another embodiment of the present disclosure.
Figure 8:
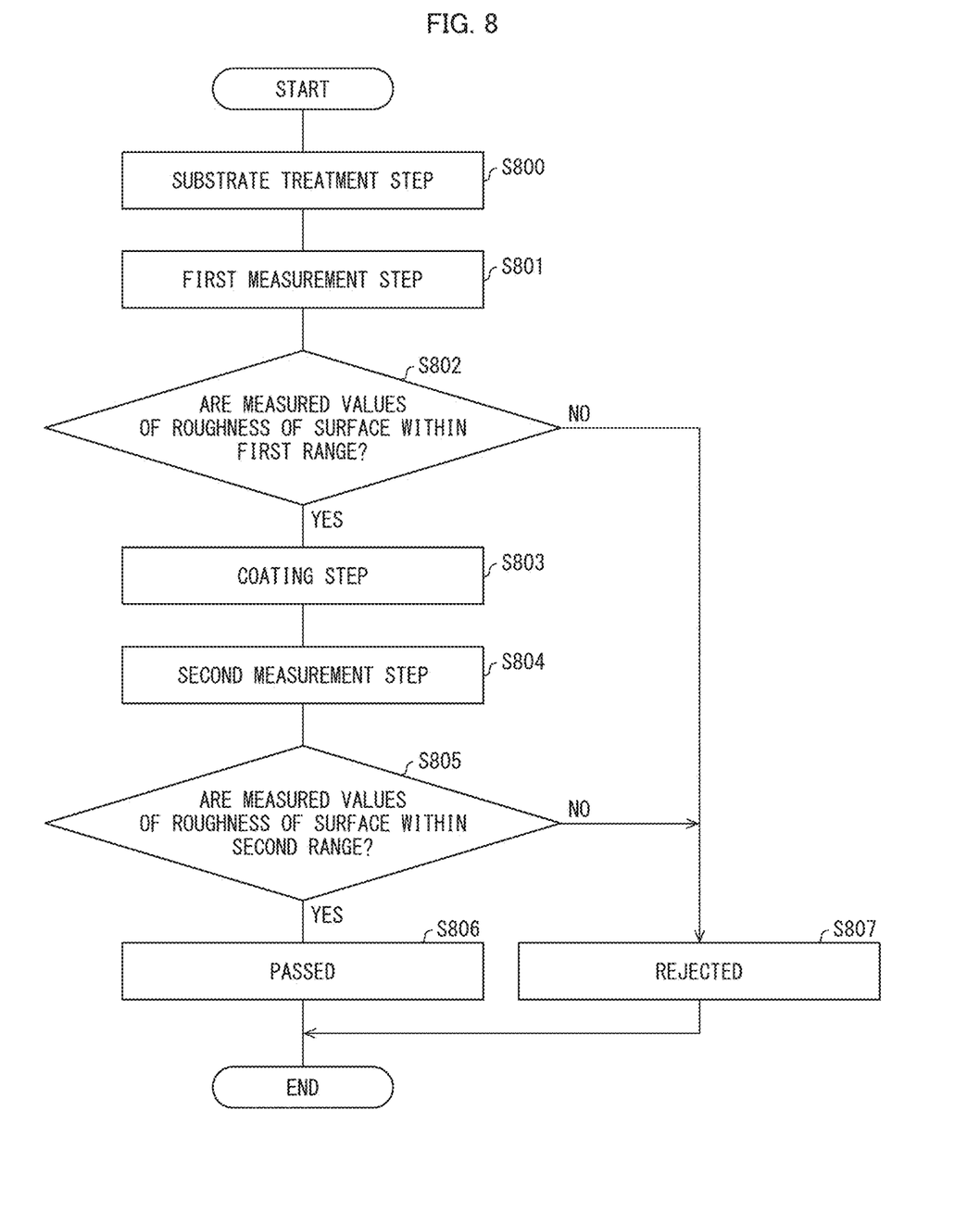
FIG. 8 is a flowchart illustrating an example of a step of checking an object to be measured by the measurement system in accordance with another embodiment of the present disclosure.

The following will describe a method for carrying out a finish inspection of an object A to be measured with use of the measurement system 1 with reference to FIGS. 7 and 8. FIGS. 7 and 8 illustrate examples of a flowchart relating to the method for carrying out a finish inspection of the object A to be measured with use of the measurement system 1.

(Checking Method 1 for Finish Inspection)

In the method for carrying out a finish inspection illustrated in FIG. 7, a finish of the surface of a display of, for example, a smartphone having been subjected to processing is checked. The surface of the display, which is the object A to be measured is sometimes subjected to a surface treatment such as anti-glare processing in which fine irregularities are formed on the surface of the display for the purpose of, for example, preventing reflection of external light. Conventionally, a haze meter is used for a finish inspection of irregularities formed on the surface of a display. However, the haze meter can measure only a limited area at a time. Therefore, it has been necessary to change the set position of the object A to be measured manually in order to check the entire surface of the display. The measurement system 1 changes the position and posture of the hand part 40, so that the measurement system 1 can carry out in-line measurement without changing the set position of the object A to be measured.

The following will describe a method for carrying out a finish inspection of the surface of the display, which is the object A to be measured, with use of the measurement system 1 with reference to FIG. 7. The object A to be measured is subjected to a surface treatment such as anti-glare processing on the surface A1 or the like thereof (S700). An efficient surface treatment such as anti-glare processing is carried out on the same belt conveyor as the one used for finish inspection. In a surface treatment that cannot be carried out on a belt conveyor, the object A to be measured is set on the belt conveyor for finish inspection after the surface treatment.

In S701, the processor 11 of the control device 10, by carrying out the measurement process on the object A to be measured on the belt conveyor for finish inspection, acquires measured values of the roughness of the surface A1 or the like of the object A to be measured that has been subjected to the surface treatment such as the anti-glare processing.

In S702, the processor 11, by carrying out the determination process, determines whether all the measured values of the roughness of the surface A1 or the like of the object A to be measured that have been acquired in S701 are within a predetermined range. In a case where all the measured values of the roughness of the surface A1 or the like of the object A to be measured are within the predetermined range (YES in S702), the processor 11 regards the object A to be measured as a passed product (S703). In a case where some of the measured values of the roughness of the surface A1 or the like of the object A to be measured are outside the predetermined range (NO in S702), the processor 11 regards the object A to be measured as a rejected product (S704) and ends the check in FIG. 7. The passed product proceeds to the next manufacturing process, and the rejected product is used to track down the cause of some of the measured values of the roughness of the surface A1 or the like of the object A to be measured falling outside the predetermined range.

(Checking Method 2 for Finish Inspection)

In the method for carrying out a finish inspection illustrated in FIG. 8, a finish of an automobile part or the like, which is the object A to be measured, after a coating step is checked. The application of a coating is an example of a surface treatment, and is carried out for the purpose of, for example, protecting the surface A1 or the like of the object A to be measured by a coating film, improving the added value of the object A to be measured by mildewproofing coating, antibacterial coating, or the like, and improving the appearance of the object A to be measured. Conventionally, a finish inspection after the coating step has often been carried out visually by an inspector. However, since the appearance of the object A to be measured changes depending on a manner in which the object A to be measured is illuminated, it has been difficult to carry out a check without overlooking scratches or the like.

The following will describe a case where one object A to be measured is to be subjected to the finish inspection. In a case where a plurality of objects A to be measured are to be subjected to the finish inspection, it is only necessary that a checking method exemplified below is carried out on each of the plurality of objects A to be measured.

Prior to the application of a coating to the object A to be measured, a surface treatment is carried out on the surface A1 or the like of the object A to be measured for the purpose of, for example, removing adhering dirt and improving the adhesion of a coating material. For example, a substrate treatment step of subjecting the surface A1 or the like of the object A to be measured to a substrate treatment for roughening is carried out (S800).

In S801, the processor 11, by carrying out the measurement process on the object A to be measured that has been subjected to the substrate treatment through the substrate treatment step in S800, carries out the first measurement step of acquiring measured values of the roughness of the surface A1 or the like of the object A to be measured.

In S802, the processor 11 carries out a first determination step of carrying out a determination process of determining whether all the measured values of the roughness of the surface A1 or the like of the object A to be measured that have been acquired in the first measurement step in S801 are within a first range of a rough surface suitable for application of a coating. In a case where all the measured values of the roughness of the surface A1 or the like of the object A to be measured are within the first range (YES in S802), the processor 11 causes the object A to be measured to proceed to the coating step (S803). Further, in a case where some of the measured values of the roughness of the surface A1 or the like of the object A to be measured are outside the first range (NO in S802), the processor 11 regards the object A to be measured as a rejected product (S807), excludes such an object A to be measured from a production line, and ends the check on the object A to be measured in FIG. 8.

In the coating step in S803, the object A to be measured for which a determination has been made in the first determination step in S802 that the roughness of the surface A1, A2, or the like of the object A to be measured is within the range of roughness suitable for application of a coating is subjected to the application of a coating, which is an example of the surface treatment (S803).

In S804, the processor 11, by carrying out the measurement process on the object A to be measured that has been subjected to the application of a coating in the coating step in S803, carries out the second measurement step of acquiring measured values of the roughness of the surface A1 or the like of the object A to be measured after the application of the coating.

In the second measurement step in S804, the posture and position of the hand part 40 may be adjusted on the basis of the path of the hand part 40 which has caused the contact 60 to follow the surface A1 or the like of the object A to be measured in the first measurement step in S801. This makes it possible to prevent the surface A1 or the like of the object A to be measured from being damaged when the contact 60 is pressed against the surface A1 or the like of the object A to be measured.

In S805, the processor 11 carries out a second determination step of carrying out a determination process of determining whether all the measured values of the roughness of the surface A1 or the like of the object A to be measured that has been acquired in the second measurement step in S804 are within a second range that represents a proper object to be measured as the object A to be measured after the application of the coating has been completed. In a case where all the measured values of the roughness of the surface A1 or the like of the object A to be measured are within a second range (YES in S805), the processor 11 regards the object A to be measured as a product that has passed the check on the coating step (S806). Further, in a case where some of the measured values of the roughness of the surface A1 or the like of the object A to be measured are outside the second range (NO in S805), the processor 11 regards the object A to be measured as a rejected product (S807), excludes such an object A to be measured from a production line, and ends the check in FIG. 8.

Variations

In the measurement system 1 in accordance with the above-described embodiment, the program 201 is assumed to be stored in the secondary memory 13 of the control device 10. However, the present disclosure is not limited to only this configuration. For example, the program 201 may be stored in a storage section outside the control device 10.

ADDITIONAL REMARK

The present disclosure is not limited to the above embodiments, but can be altered within the scope of the claims. The present disclosure also encompasses, in its technical scope, any embodiment derived by appropriately combining technical means disclosed in differing embodiments.

The invention claimed is:

1. A measurement system comprising:
    a contact configured to detect roughness of a surface of an object to be measured;
    a hand part to which the contact is attached;
    a robot arm supporting the hand part so as to allow a position and posture of the hand part to be changed;
    a force sensor configured to, when the contact is pressed against the surface of the object to be measured, detect a reaction force from the surface of the object to be measured to the contact; and
    a control device including a storage section storing three-dimensional data on a three-dimensional shape of the object to be measured and one or more processors,
    the one or more processors carrying out:
    a route setting process of, on a basis of the three-dimensional data, setting a movement route to be taken by the hand part to cause the contact to follow the surface of the object to be measured in such a manner that the reaction force detected by the force sensor becomes a predetermined value;
    a first acquisition process of actually causing the contact to follow the surface of the object to be measured while adjusting the reaction force detected by the force sensor to become the predetermined value, and acquiring a path taken by the hand part which has actually moved;
    a second acquisition process of acquiring the roughness of the surface of the object to be measured from the contact during a period in which the contact is actually caused to follow the surface of the object to be measured in the first acquisition process; and
    a dimension measurement process of measuring a dimension of the object to be measured on a basis of the path and at least one selected from the group consisting of the movement route and the three-dimensional data.

2. The measurement system according to claim 1, wherein
the force sensor is capable of detecting the reaction force for each of respective magnitudes of force exerted in directions if three axes orthogonal to each other and respective magnitudes of moment about the three axes, and in the first acquisition process, while causing the contact to follow the surface of the object to be measured, the one or more processors:

adjust the posture of the hand part so that a normal direction of the surface of the object to be measured becomes parallel to a direction of one axis among the three axes;

adjust the position of the hand part so that a magnitude of reaction force exerted in the direction of one axis and magnitude of moment about the one axis each become the predetermined value; and acquire the path taken by the hand part which has actually moved.

3. The measurement system according to claim 1, wherein the contact includes:

a detection section configured to detect the roughness of the surface of the object to be measured; and a housing section configured to, while the contact is not pressed against the surface of the object to be measured, cause at least part of the detection section to protrude outside the housing section and, while the contact is pressed against the surface of the object to be measured, cause the detection section to be held in the housing section, and when the contact is pressed against the surface of the object to be measured, the force sensor detects the reaction force from the surface of the object to be measured to the housing section.

4. The measurement system according to claim 1, wherein, in the dimension measurement process, the dimension of the object to be measured is measured on the basis of an amount of deviation between the movement route and the path and the three-dimensional data.

5. The measurement system according to claim 1, wherein the three-dimensional data further includes information on the roughness of the surface of the object to be measured, and the one or more processors further carry out:

a first checking process of checking whether a difference between the roughness of the surface of the object to be measured that has been acquired in the second acquisition process during the acquiring of the path in the first acquisition process and the roughness of the surface of the object to be measured based on the three-dimensional data is within a predetermined range; and a second checking process of checking whether a difference between the dimension of the object to be measured that has been subjected to the measurement in the dimension measurement process and a dimension based on the three-dimensional data is within a predetermined range.

6. The measurement system according to claim 1, wherein the object to be measured is a target material used in a thin film manufacturing process or a plastic molded product.

* * * * *